UNITED STATES PATENT OFFICE.

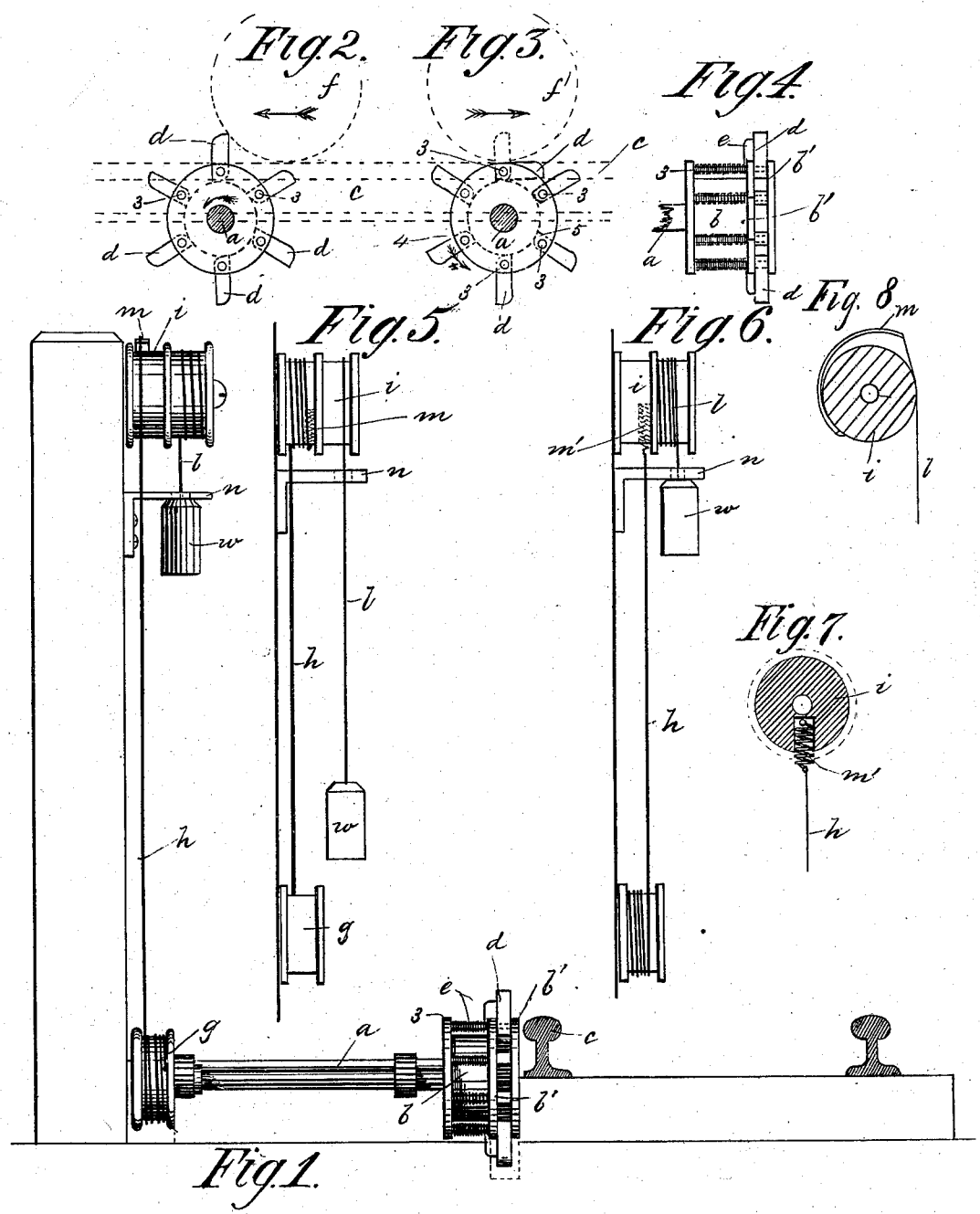
W. W. GARY.
Automatic Winding Apparatus for Railway Signals.
No. 240,696. Patented April 26, 1881.

WESLEY W. GARY, OF BOSTON, MASSACHUSETTS.

AUTOMATIC WINDING APPARATUS FOR RAILWAY-SIGNALS.

SPECIFICATION forming part of Letters Patent No. 240,696, dated April 26, 1881.

Application filed October 7, 1880. (No model.)

*To all whom it may concern:*

Be it known that I, WESLEY W. GARY, of Boston, county of Suffolk, and State of Massachusetts, have invented a new and useful Improvement in Automatic Winding-Apparatus for Railway-Signals, of which the following description, in connection with the accompanying drawings, is a specification.

My invention relates to an automatic winding apparatus for railway-signal mechanism.

In another application filed October 1, 1880, I have described an automatic winding apparatus operated by the wheels passing over and depressing a treadle acting against the force of a spring which vibrated the said treadle and connected mechanism back in the opposite direction as soon as the wheel had passed. By this means a vibrating movement was produced, and by suitable mechanism was caused to transmit a rotary movement in one direction to a winding-shaft to wind the weight or spring.

My present invention has for its object to enable the wheels to produce directly a rotary movement in one direction in a shaft placed on the road-bed near the rails. The said shaft is provided with an actuating-drum placed close by the rail of the track, and the said drum is provided with radial wings, extended beyond its periphery in position to be successively struck by the wheels of the passing train, and moved thereby to rotate the said drum and connected shaft. The periphery of the said drum lies wholly below the level of the top of the rail, and the wings are so placed that one of them will always extend above the said level, so that as a wheel passes its tread will strike the said wing, carrying it forward and rotating the said drum until the said wing is brought down to the level of the top of the rail, and in this movement a succeeding wing is brought above the said level to be struck and turned in the same manner by the succeeding wheel. The said wings are pivoted to the said drum in such manner that they will turn independently thereof in one direction, they then folding down within the periphery of the said drum, and in such movement acting against a spring which normally retains the said wings, extended radially from the said drum. When the wheels pass in the opposite direction to that previously described, by which the drum and shaft are rotated, they, in acting on the said wings, merely fold them down upon the periphery of the said drum without causing it or the connected shaft to rotate. The movement is transmitted from this rotating shaft to a winding shaft or drum to wind the actuating weight or spring, and when the said weight is wholly wound the rotating shaft is arranged to be operated by the wheels without further rotating the said winding shaft or drum. This is done in this instance in the following manner: The main shaft, rotated by the wheels, is provided with a winding-cylinder, upon which, as the said shaft is rotated by the wheels, a cord is wound, which may be called the "winding-cord," it being at the same time unwound from a winding-drum, which may be a barrel containing a spring, or, as herein shown, has a weight-suspending cord wound upon it in the opposite direction to the winding-cord, so that in the rotation of the winding-drum, as the winding cord is unwound, as before described, the weight-suspending cord is wound and the weight elevated, and when the weight falls in actuating the mechanism it causes the main shaft to rotate back in the opposite direction to that in which it was turned by the wheels. The winding cord is connected at its end with the winding-drum by a yielding or elastic connector, so that when it is wholly unwound—at which time the weight is wholly wound up—the further tension of the winding-cord merely stretches the said connector without turning the drum; and as soon as a wheel has passed to turn the actuating-drum and stretch the said connector the latter, by its elasticity, turns the said drum back, so that as the remaining wheels pass the said actuating-drum and main shaft merely oscillate back and forward under the alternate action of each wheel and the flexible connector.

Figure 1 is a side elevation of an automatic winding apparatus, the rails being shown in section; Fig. 2, a detail, showing the drum and its wings in position, to be engaged and rotated by a passing wheel; Fig. 3, a similar detail, showing the operation when the wheel passes in the opposite direction and depresses the wing without rotating the drum; Fig. 4, a side view of the said drum detached, and Figs. 5, 6, 7, 8, details illustrating the operation of the mechanism to prevent overwinding.

The main shaft $a$, connected with the sleeper or other suitable frame-work on the road-bed, has rigidly connected thereto at one end an actuating-drum, $b$, provided at its periphery with flanges $b'$, which lie close beside and just below the level of the top of the rail $c$. The said actuating-drum $b$ has a series of wings, $d$, pivoted between the flanges $b'$ on pins 3, and operated upon by springs $e$, shown as spiral springs coiled around the said pins 3 and tending to turn the said wings on the said pins in the direction of the arrow 4, Fig. 3, the said wings being held in a substantially radial position under the action of the said springs by the engagement of their lower corner, 5, with the cylindrical surface of the said drum $b$. The opposite lower corners of the said wings $d$ are rounded, as shown in Figs. 2 and 3, to allow them to be turned against the action of the springs $e$ down upon the periphery of the drum $b$, between the flanges $b'$ $b'$ thereon, as shown in Fig. 3, when the upper one of the said wings, normally held in the position shown in dotted lines by the spring $e$, is shown in full lines as turned down by the wheel $f'$ passing in the direction of the arrow, Fig. 3, over the rail $c$.

A winding-cylinder, $g$, is secured upon the main shaft $a$, and a winding cord, $h$, fastened at one end to the said cylinder, is coiled around it and extended to and coiled around a winding-drum, $i$, so that as it is wound upon the cylinder $g$ it is unwound from the drum $i$, causing the said drum to rotate in the operation.

A suspending-cord, $l$, connected at one end with the winding-drum $i$, and supporting at its other end a weight, $w$, is adapted to be wound upon the said drum $i$ in the opposite direction to the winding-cord $h$, so that as one of the said cords is wound the other one is unwound. The winding-cord $h$ is connected at its end with the winding-drum $i$ by a yielding or elastic connector, (shown in Figs. 1 and 8,) as a flat spring, $m$, passing about a portion of the periphery of the said drum, and normally held separated therefrom by its elasticity, and in Figs. 5, 6, and 7, as a spiral spring, $m'$, passing radially out from a point of attachment near the middle of the said drum, and when the winding cord $h$ is wholly unwound from the drum $m$, as shown in Figs. 1, 6, and 7, any further strain on the said cord merely operates against the elastic force of the said spring without any further tendency to turn the said drum, the weight $w$ being at this time wholly wound up and brought against a stop, $n$, on the frame-work.

In operation, when a wheel, $f$, passing in the direction of the arrow, Fig. 2, meets one of the wings $d$, it presses the said wing forward and downward to the level of the rail, and in so doing rotates the drum $b$ and connected shaft $a$ in the direction of the arrow therein, as in Fig. 2, and brings the next wing up in position to be struck by the next wheel. Should this latter wing be brought forward so quickly as to itself meet the tread of the wheel on the rear side, it will merely be turned back on its pivot 3, the spring $e$ thereof yielding to allow this movement. In this manner as the wheels follow one another each turns the actuating-drum $b$ and shaft $a$ through the angular space between two of the said wings, and the rotary motion is imparted to the shaft $a$ and cylinder $g$ thereon in the proper direction to wind the cord $h$ upon said cylinder, thereby rotating the drum $i$ and winding the cord $l$ therein to raise the weight $w$. When the said weight is raised sufficiently to meet the stop $n$, the cord $h$ is wholly unwound from the drum $i$, and the further movement of the shaft $a$ and cylinder $g$ to wind the cord $h$ on the said cylinder has no further tendency to rotate the drum $i$, the spring $m$ or $m'$ then yielding, as shown in Fig. 7, to allow the cord $h$ to be wound on the drum $g$, while a wheel is passing and partially rotating the shaft $a$, the said spring acting by its elastic force to rotate the shaft $a$ back again as soon as a wheel has passed the wing $d$, and before a succeeding wheel has time to act upon the next wing. When a train passes in the opposite direction, as shown in Fig. 3, it merely operates upon the said wings to turn them down below the level of the rail on their pivots 3 without turning the said drum, its friction or resistance to the movement of the shaft $a$ being greater than that of the springs $e$ to the movement of the wings $d$ when acted upon on their rear sides.

This arrangement is suitable for either a single or double track road, since on a single-track road there will be sufficient traffic passing in either one direction to keep the signal-actuating weight or springs properly wound.

The drum $i$ may be connected with any sort of signal mechanism in any usual way to properly actuate it.

I claim—

1. In an automatic winding mechanism for railway-signals, an actuating-drum placed beside the track, combined with a series of wings on the said drum, projecting above the level of the rails, to be successively struck by the treads of the passing wheels, to impart a progressive rotary motion to the said drum and thereby wind an actuator, substantially as described.

2. The main shaft and drum thereon having projections to be successively struck by the wheels of a passing train, to progressively rotate the said shaft, combined with mechanism connected with the said shaft, whereby the said rotary movement is transmitted to an actuator to wind it, and after it is wholly wound is inoperative on the said actuator, to prevent injury to the mechanism from over-winding, substantially as and for the purpose described.

3. In an automatic winding mechanism for railway-signals, the main shaft and its actuating-drum, combined with the wings pivoted on the said drum, and springs to normally retain the said wings in a position substantially radial to the said drum, the said wings being adapted to be struck by the wheels of a passing train, and to rotate the said drum with them in one direction, but to turn independently thereof on their pivots in the other direction, substantially as described.

4. The main shaft free to turn in either direction, and the actuating drum thereon adapted to be turned in one direction by the passing wheels, combined with the winding-cylinder and winding-cord coiled at one end thereon, and connected at the other end with a winding-drum by a yielding or elastic connector, whereby, when unwound from the said drum, it operates to strain the said connector without further rotating the drum, substantially as described.

In testimony whereof I have signed my name to this specification in the presence of two subscribing witnesses.

WESLEY W. GARY.

Witnesses:
JOS. P. LIVERMORE,
ARTHUR REYNOLDS.